United States Patent [19]

Maurer et al.

[11] 4,394,358

[45] Jul. 19, 1983

[54] PRODUCTION OF GRANULAR ALKALI METAL DIPHOSPHATES OR TRIPHOSPHATES

[75] Inventors: Alexander Maurer; Renate Adrian; Herbert Panter, all of Hürth; Gero Heymer; Dieter Nölker, both of Erftstadt, all of Fed. Rep. of Germany

[73] Assignee: Hoechst Aktiengesellschaft, Fed. Rep. of Germany

[21] Appl. No.: 303,100

[22] Filed: Sep. 17, 1981

[30] Foreign Application Priority Data

Sep. 23, 1980 [DE] Fed. Rep. of Germany ....... 3035820

[51] Int. Cl.$^3$ .............................................. C01B 25/30
[52] U.S. Cl. ..................................... 423/305; 423/315
[58] Field of Search ............... 423/305, 315; 71/34, 71/36

[56] References Cited

U.S. PATENT DOCUMENTS

| | | | |
|---|---|---|---|
| 2,419,148 | 4/1947 | King | 423/315 |
| 2,568,110 | 9/1951 | Beiley et al. | 252/135 |
| 3,233,967 | 2/1966 | Shen | 423/315 |
| 3,761,573 | 9/1973 | Hinz et al. | 423/315 |
| 3,911,086 | 10/1975 | Sheridan et al. | 423/315 |
| 3,978,195 | 8/1976 | Schrödter | 423/305 |
| 4,008,065 | 2/1977 | Hauschild | 423/315 |
| 4,009,137 | 2/1977 | Dany et al. | 260/33.4 R |

FOREIGN PATENT DOCUMENTS 664907 6/1963 Canada .............................. 423/315

Primary Examiner—O. R. Vertiz
Assistant Examiner—Wayne A. Langel
Attorney, Agent, or Firm—Connolly and Hutz

[57] ABSTRACT

The invention relates to a process for making granulated, partially or completely hydrated alkali metal diphosphates or triphosphates. To this end, the invention provides for alkali metal diphosphates or triphosphates which consist to an extent of at least 20% of particles with a size of less than 0.045 mm and are hydrated to an extent of less than 90%, based on the phosphates' theoretical content of water of hydration, to be intensively mixed and granulated in the presence of water and an ammonium polyphosphate, this latter being used in a proportion of about 0.5 to 50 weight %, based on the quantity of water used.

9 Claims, No Drawings

PRODUCTION OF GRANULAR ALKALI METAL DIPHOSPHATES OR TRIPHOSPHATES

Sodium triphosphate, sometimes called sodium tripolyphosphate, briefly termed STPP hereinafter, is normally made by heating an aqueous solution or suspension of various sodium orthophosphates with a Na/P-molar ratio of 5:3 to temperatures higher than 250° C. Two processes are customarily used to achieve this, namely once a process wherein the orthophosphate solution is spray-dried in a spray tower, and once a process wherein the phosphate solution is dried and calcined inside a rotary kiln. Pure anhydrous but pulverulent STPP is obtained in the two processes. Tetrasodium disphosphate sometimes called sodium dipolyphosphate or pyrophosphate, briefly termed TSPP hereinafter, is produced in analogous fashion however with the use of an orthophosphate solution with a Na/P-ratio of 2:1. The two products find widespread use as builders in detergent compositions.

More recently, granulated STPP or TSPP has to an increasing extent gained interest for use in the detergent industries. In the production of detergent and cleaning compositions, the granulated products compare favorably with pulverulent material, especially in those cases in which the individual detergent compounds are admixed with solid phosphate. Technically beneficial effects reside more particularly in the following: Detergent and cleaning compositions made therewith have a reduced tendency to coalesce and considerably less dust is liable to be formed on subjecting the detergent components to processing treatment.

The delayed admixture of STPP has a further desirable result, namely that it is thereby made possible for the STPP to remain granular longer than heretofore; this in turn is of importance to the recently targeted production of detergent compositions with a reduced total phosphate content therein.

Attempts have already been made in the past to produce especially granular STPP. German Specification DE-PS No. 20 08 495, for example, describes a process for making granular alkali metal polyphosphate, wherein alkali metal triphosphate with a certain particle size is granulated by spraying an aqueous alkali metal orthophosphate solution thereonto, the granulate is dried and calcined by heating it to temperatures between 300° and 600° C. This process indeed produces granular STPP of desirable particle size and properties but it is obligatory for the granulate to be dried and calcined by process steps which call for heavy expenditure of energy, where economy thereof would be highly desirable last but not least in a time of increasing energy costs.

A process similar to that described in German Specification DE-PS No. 20 08 495 has been disclosed in German Specification DE-AS No. 25 15 141, wherein STPP is granulated once again by spraying an aqueous alkali metal orthophosphate solution of a certain concentration thereonto, and calcining the resulting granulate at temperatures between 300° and 600° C.

German Specifications DE-OS No. 24 54 448 and DE-OS 20 46 658 describe the manufacture of various mixed granulates comprised of various detergent ingredients, e.g. of STPP and alkali metal silicate. The use of such granulates has however been found to entail the following serious disadvantages for the detergent producer: He is unduly handicapped in selecting the individual ingredients and the mixing ratio in the final product, and he may even be compelled to incorporate ingredients which he deems undesirable, or to additionally use the granulate in admixture with the necessary proportions of individual detergent components, which must naturally be stored.

It is therefore desirable to have a granulate which consists exclusively of phosphate salts and is easy to make just by granulation without the need to subject it to further processing steps, such as drying and calcining and similar treatment. To obtain such granulate, it has heretofore been indispensable for the material which is to be granulated to be admixed with more water than necessary to effect the formation of the corresponding hydrates, for the materials to be then granulated with the use of the water in excess, and for the granulated material to be dried and calcined as a result of the tendency, especially of sodium triphosphate, to undergo hydrolysis. Needless to say this is a procedure which entails heavy expenditure of energy.

We have not found that alkali metal diphosphates or triphosphates can be granulated without it being necessary for the resulting granulate to be dried and calcined provided that an aqueous ammonium polyphosphate solution is used as a granulating aid, the solution containing at most a quantity of water necessary to effect the formation of the disphosphate or triphosphate decahydrate or hexahydrate.

The present invention relates more particularly to a process for making granulated, partially or completely hydrated alkali metal diphosphates or triphosphates, wherein pulverulent, anhydrous or partially hydrated alkali metal diphosphates or triphosphates are intensively mixed and granulated in the presence of water and a phosphate salt other than the alkali metal diphosphate or triphosphate, which comprises: intensively mixing and granulating alkali metal diphosphates or triphosphates consisting to an extent of at least 20% of particles with a size of less than 0.045 mm and hydrated to an extent of less than 90%, based on the phosphates' theoretical content of water of hydration, in the presence of a quantity of water at most necessary for completely hydrating the alkali metal diphosphates or triphosphates and in the presence of an ammonium polyphosphate, this latter presenting a degree of condensation of 3 up to about 1000 and being used in a proportion ob about 0.5 to 50 weight %, based on the quantity of water used.

The alkali metal diphosphates or triphosphates which should preferably be used are comprised of anhydrous or partially hydrated tetrasodium diphosphate and pentasodium triphosphate respectively, the pulverulent substances presenting the following particle size distribution:

up to 0.045 mm = 20–100%
0.045–0.1 mm = up to 70%
>0.1 mm = up to 50%

The use of material containing more than 20% of particles with a size of less than 0.045 mm favorably influences the granulation relative to the throughput rate. In the event of material containing less than 20% of these particles, the proportion of fine particles is insufficient for occupying intermediate free spaces and strengthening the granulate.

If use is made of pentasodium triphosphate, it is preferable for the anhydrous or partially hydrated product which is employed in the process to contain at least 10%, preferably 10 to 50%, of phase-I material, the balance being phase-II and amorphous material, as this permits the granulating period to be shortened and the throughput to be accelerated.

It is also possible in accordance with this invention to use partially hydrated alkali metal diphosphate or triphosphate which is hydrated to an extent of 0.1 up to 60 weight %, the balance being free from water.

The quantity of water necessary for granulation should preferably be selected so as to obtain granular alkali metal diphosphate or triphosphate of which at least 10% has the theoretical content of water of hydration therein.

The ammonium polyphosphate which is used in the present process has the following general formula

$H_{(n-m)+2}(NH_4)_m P_n O_{3n+1}$ in which n stands for an integral average value of 3 to 1000, m stands for a whole number of up to n+2, and the m/n-ratio is between about 1.0 and 1.67.

The process of this invention can be carried out, for example, by spraying water with thorough agitation on to a mixture of anhydrous or partially hydrated alkali metal diphosphate or triphosphate and ammonium polyphosphate, or by spraying an aqueous, about 0.5 to 20 weight % solution or suspension of ammonium polyphosphate on to the alkali metal diphosphate or triphosphate. The ammonium polyphosphate should preferably be used in proportions of 0.5 to 20 weight %, based on the quantity of water. It is possible for the granulation to be effected with the use of customary devices, such as a granulating plate or drum, mixer, rotary tube, fluidized bed drier and the like. More particularly, the granulating liquid is sprayed through a nozzle on to the solid phosphate, water being chemically combined. In the absence of water in excess, solid dry granulate which need not separately be dried and calcined is obtained.

Granulate made in accordance with this invention, e.g. from pentasodium triphosphate, has a water content which at most corresponds to that of the hexahydrate. It is therefore not necessary for the granulate to be dried and calcined, after granulation. During the granulating step, the triphosphate is not liable to undergo hydrolysis as the hydratation heat set free during that operation does not exceed 60° C. Tests made on the granulate have shown it to have triphosphate values the same as the starting material. In other words, the granulate presents the high triphosphate content which is so desirable for further processing. Despite the fact that the granulate is not separately dried and calcined, it is very hard so that it can be admixed with detergent compositions, while dry. Dissolved in water, it does not tend to coalesce, and the content of ammonium polyphosphate therein makes it possible for the water to remain free from insoluble matter which is desirable for the use of the granulate in detergent compositions.

In those cases in which it is desirable to have granulate showing a certain particle size distribution, it is good practice for the product coming from the granulating stage to be directly passed through a sieve. Finer or coarser material than desired is removed and recycled to the granulating stage, coarser material being first ground. It is more preferable, however, to introduce the granulate coming from the granulating stage into a grading or sorting apparatus, separate it therein just from dust and directly recycle the latter, the separated granulate being stored or packed.

Tetrasodium diphosphate can basically be granulated under the same conditions as those selected for granulating pentasodium triphosphate save that the hydration water content of the hydrated diphosphate is 10 water of crystallization. Granulate made from tetrasodium diphosphate has the same advantageous properties as those described hereinafter for granulate made from the pentasodium triphosphate.

The following Examples illustrate the invention which is naturally not limited thereto;

EXAMPLE 1

Pentasodium triphosphate was placed on a rotating table which had a diameter of 1 m and a border height of 10 cm, was inclined at an angle of 48° with respect to the horizontal and rotated with a speed of 50 rpm. By means of compressed air of 0.5 bar a solution of APP in water was passed through a two opening nozzle with a bore 2.3 mm wide, and sprayed on to the triphosphate which was thereby granulated. The product which had been subjected to ignition was found to undergo a 0.5 weight % loss on ignition, determined at 500° C. The STPP contained 26 weight % of the high temperature modification I and consisted to an extent of 63% of particles with a size of less than 0.045 mm. The quantity of STPP fed to the rotating plate per hour, i.e. the throughput rate, was 50 kg/h. A 4 weight % suspension of commercial APP with an average degree of condensation of 470 in water was simultaneously supplied through the above two opening nozzle in a quantity necessary for the final granulate to contain 16.6 weight % water, determined as loss on ignition at 500° C. The temperature on the rotating plate was less than 40° C. during granulation. Only granulate was taken from the rotating plate via a sorting device, while pulverulent matter which had not been granulated was directly returned to the table and granulated once again. Granulate identified as granulate A in the Table hereinafter was obtained.

EXAMPLE 2

The procedure was as in Example 1, but STPP which underwent an 0.8 weight % loss on ignition, contained 26 weight % of modification I and consisted to an extent of 56% of particles with a size of less than 0.045 mm was used. As described in Example 1, a 1.5 weight % solution of APP in water was added in a quantity necessary for the final granulate to contain 13.0 weight % water. 30 kg granulate was taken per hour from the rotating plate. It was not dried or calcined. STPP-granulate identified as granulate B in the Table hereinafter and with the properties specified therein was obtained.

EXAMPLE 3

The procedure was as in Example 1, but STPP which underwent an 0.1 weight % loss on ignition, contained 50 weight % modification I and consisted to an extent of 90% of particles with a size of less than 0.045 mm was used. The throughput rate was 25 kg/h. Sprayed onto the STPP was a 1.5 weight % aqueous APP-solution and granulate containing 21.5 weight % water was obtained. It was not granulated or calcined. The granulate identified as granulate C in the Table hereinafter with the properties specified therein was obtained.

EXAMPLE 4

The procedure was as in Example 1, but STPP which underwent an 0.1 weight % loss on ignition, contained 50 weight % of modification I and consisted to an extent of 46% of particles with a size of less than 0.045 mm was used. The throughput rate was 50 kg/h. A 5 weight % APP-suspension in water, the APP having a degree of condensation of 120, was sprayed on to the StPP until the granulate was found to contain 14.0 weight % of water. The granulate was not dried or granulated. Granulate identified as granulate D in the Table hereinafter with properties specified therein was obtained.

EXAMPLE 5

The procedure was as in Example 1, but STPP which underwent an 0.1 weight % loss on ignition, contained 29 weight % of modification I and consisted to an extent of 80% of particles with a size of less than 0.045 mm was used. Sprayed on to the STPP was a 1.5 weight % APP-solution and granulate containing 20.0 weight % water was obtained. The throughput rate was 15 kg/h. Granulate identified as granulate E in the following Table with the properties specified therein was obtained.

EXAMPLE 6

The procedure was as in Example 1, but STPP which underwent an 0.1 weight % loss on ignition, contained 17 weight % of modification I and consisted to an extent of 90% of particles with a size of less than 0.045 mm was used. Sprayed on to the STPP was a 1.5 weight % APP-solution and granulate containing 16.6 weight % water was obtained. The throughput rate was 10 kg/h. Granulate identified as granulate F in the following Table with the properties specified therein was obtained.

EXAMPLE 7

30 kg/h STPP which underwent an 0.3 weight % loss on ignition, contained 26 weight % of modification I and consisted to an extent of 63% of particles with a size of less than 0.045 mm was granulated in a Loedige-type mixer. A 5% aqueous APP-suspension was sprayed through a dual feed nozzle on to the STPP and final granulate containing 19.8 weight % water was obtained. Next, the granulate was passed through a sieve to remove particles with a size of less than 0.1 mm and more than 2.0 mm, respectively. Granulate identified as granulate G in the following Table was obtained.

EXAMPLE 8

STPP was granulated inside a rotary tube which was operated at a speed of 7.5 rpm. The rotary tube was supplied with 150 kg/h pulverulent STPP which underwent a 1.0 weight % loss on ignition, contained 23 weight % of modification I and consisted to an extent of 66% of particles with a size of less than 0.045 mm. Sprayed on to the STPP was 32 l/h of a 4% aqueous APP-suspension. The APP had a degree of condensation of 257. The granulate taken from the rotating tube was placed on a sieve and freed from particles with a size of more than 2 mm and less than 0.1 mm, respectively. 120 kg/h STPP granulate identified as granulate H in the Table hereinafter with the properties specified therein was obtained.

EXAMPLE 9

The procedure was as in Example 1, but tetrasodium diphosphate which underwent an 0.1 weight % loss on ignition and consisted to an extent of 80% of particles with a size of less than 0.045 mm was used. An aqueous 4% suspension of commercial APP which had an average condensation degree of 270 was added through a dual feed nozzle, and granulate containing 35.0 weight % water was obtained. 15 kg/h granulate was put through. The granulate was passed through a sieve with meshes 0.1 mm wide and freed from particles smaller than 0.1 mm. The tetrasodium diphosphate granulate so made had the following properties:
Loss on ignition of granulate: 35.0 weight %
Apparent density: 571 g/l
Abrasion, determined by drum method: 50.0 weight %
Water-insoluble residue on dissolving granulate in water: 0.1 weight %
Particle size distribution:
 larger than 1.6 mm: 26.5%
 0.8–1.6 mm: 44.9%
 0.4–0.8 mm: 15.4%
 0.1–0.4 mm: 13.2%
 less than 0.1 mm: 0.0%

TABLE

| Properties of granulate | GRANULATE | | | | | | | |
|---|---|---|---|---|---|---|---|---|
| | A | B | C | D | E | F | G | H |
| STPP-content calculated as (% $P_2O_5$) | 95.3 | 95.6 | 96.1 | 96.3 | 95.8 | 95.4 | 95.3 | 95.7 |
| Phase-I-content (Weight %) | 19 | 15 | — | 14 | — | 17 | — | 17 |
| Loss on ignition at 500° C. (Weight %) | 16.6 | 13.0 | 21.5 | 14.0 | 20.0 | 16.6 | 19.8 | 16.8 |
| Apparent Density (g/l) | 700 | 667 | 632 | 643 | 610 | 650 | 800 | 614 |
| Abrasion (Weight %)[1] | 77 | 56 | 54 | 70 | 52 | 50 | 87 | 78 |
| Particle size distribution | | | | | | | | |
| larger than 1.6 mm | 15.6 | 16.4 | 17.2 | 14.1 | 16.8 | 18.9 | 6.8 | 9.8 |
| 0.8–1.6 mm | 69.1 | 59.8 | 66.3 | 59.7 | 59.2 | 63.5 | 60.0 | 49.9 |
| 0.4–0.8 mm | 13.0 | 19.1 | 10.4 | 21.2 | 22.1 | 14.6 | 28.3 | 27.1 |
| 0.1–0.4 mm | 2.0 | 4.2 | 4.3 | 4.5 | 1.6 | 2.8 | 4.9 | 13.2 |
| less than 0.1 mm | 0.0 | 0.5 | 0.4 | 0.5 | 0.3 | 0.2 | 0.0 | 0.0 |
| Water-insoluble residue upon dissolution in water (Weight %) | <0.1 | <0.1 | <0.1 | <0.1 | <0.1 | <0.1 | <0.1 | <0.1 |

[1]Drum method: cf. DE-PS 20 08 495 with use of 0.18 mm test sieve; residue on test sieve

We claim:
1. In the process for making granular, partially or completely hydrated alkali metal diphosphates or triphosphates, wherein pulverulent, anhydrous or par- tially hydrated alkali metal diphosphates or triphosphates are intensively mixed and granulated in the presence of water and a phosphate salt other than the alkali metal diphosphate or triphosphate, the improvement which comprises: intensively mixing and granulating alkali metal diphosphates or triphosphates consisting to an extent of at least 20% of particles with a size of less than 0.045 mm and hydrated to an extent of less than 90%, based on the phosphates' theoretical content of water of hydration, in the presence of a quantity of water at most necessary for completely hydrating the alkali metal diphosphates or triphosphates and in the presence of an ammonium polyphosphate, this latter presenting a degree of condensation of 3 up to about 1000 and being used in proportion of about 0.5 to 50 weight %, based on the quantity of water used.

2. The process as claimed in claim 1, wherein anhydrous or partially hydrated tetrasodium dipolyphosphate or pentasodium tripolyphosphate with the following particle size distribution:
up to 0.045 mm = 20–100%
0.045–0.1 mm = up to 70%
>0.1 mm = up to 50%
is granulated.

3. The process as claimed in claim 1, wherein the anhydrous pentasodium tripolyphosphate contains more than 10%, preferably 10 to 50%, of phase-I material, the balance being phase-II material and amorphous material.

4. The process as claimed in claim 1, wherein the partially hydrated alkali metal dipolyphosphate or tripolyphosphate used is hydrated to an extent of 0.1 to 60 weight %, the balance being free from water.

5. The process as claimed in claim 1, wherein the quantity of water necessary for the granulation is selected so as to obtain granulated alkali metal dipolyphosphate or tripolyphosphate of which at least 10 weight % has the theoretical content of water of hydration therein.

6. The process as claimed in claim 1, wherein the ammonium polyphosphate corresponds to the following general formula

$$H_{(n-m)+2}(NH_4)_m P_n O_{3n+1}$$

in which n stands for an integral average value of 3 up to 1000, m stands for a whole number of up to n+2 and the m/n-ratio is between about 1.0 and 1.67.

7. The process as claimed in claim 1, wherein the granulate is made by spraying water with thorough agitation onto a mixture of anhydrous or partially hydrated alkali metal dipolyphosphate or tripolyphosphate and ammonium polyphosphate, or by spraying an aqueous solution or suspension of ammonium polyphosphate onto the alkali metal diphosphate or triphosphate.

8. The process as claimed in claim 7, wherein an about 0.5 to 20 weight % solution or suspension of the ammonium polyphosphate is sprayed on to the alkali metal dipolyphosphate or tripolyphosphate.

9. The process as claimed in claim 1, wherein the ammonium polyphosphate is used in a proportion of 0.5 to 20 weight %, based on the quantity of water used.

* * * * *